United States Patent
Yokoi

(10) Patent No.: US 11,106,259 B2
(45) Date of Patent: Aug. 31, 2021

(54) ANALYTICAL DEVICE, CONTROLLER, AND ANALYTICAL SYSTEM INCORPORATING A MAIN POWER SWITCH AND POWER SUPPLY INSTRUCTION PART DISPOSED SEPARATELY FROM THE MAIN POWER SWITCH

(71) Applicant: SHIMADZU CORPORATION, Kyoto (JP)

(72) Inventor: Yusuke Yokoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 115 days.

(21) Appl. No.: 16/603,224

(22) PCT Filed: Apr. 14, 2017

(86) PCT No.: PCT/JP2017/015345
§ 371 (c)(1),
(2) Date: Oct. 5, 2019

(87) PCT Pub. No.: WO2018/189893
PCT Pub. Date: Oct. 18, 2018

(65) Prior Publication Data
US 2020/0033929 A1 Jan. 30, 2020

(51) Int. Cl.
*G06F 1/30* (2006.01)
*G06F 1/3228* (2019.01)
(Continued)

(52) U.S. Cl.
CPC ............... *G06F 1/30* (2013.01); *G06F 1/26* (2013.01); *G06F 1/3206* (2013.01);
(Continued)

(58) Field of Classification Search
CPC ...... G06F 11/0751; G06F 1/30; G06F 1/3228; G06F 1/3287; G06F 11/0772;
(Continued)

(56) References Cited

U.S. PATENT DOCUMENTS 5,815,409 A * 9/1998 Lee ........................... G06F 1/30
700/286
5,918,059 A * 6/1999 Tavallaei .................. G06F 1/26
713/300
(Continued)

FOREIGN PATENT DOCUMENTS

CN 106461687 A 2/2017
JP 2015-219039 A 12/2015
(Continued)

OTHER PUBLICATIONS

Office Action for corresponding Japanese Application No. 2019-512156 dated Apr. 21, 2020.
(Continued)

*Primary Examiner* — Chun Cao
(74) *Attorney, Agent, or Firm* — Renner, Otto, Boisselle & Sklar, LLP

(57) ABSTRACT

An analytical device is an analytical device in an analytical system including one or more of the analytical devices and a controller that controls the analytical devices. The analytical device includes a communication part configured to communicate with the controller and a power supply control part configured to switch between a power-on state and a software power-off state of the analytical device by software based on an instruction to switch the analytical device to the power-on state or the software power-off state, the instruction being transmitted from the controller via the communication part.

7 Claims, 4 Drawing Sheets

(51) Int. Cl.
  *G06F 1/3287* (2019.01)
  *G06F 11/07* (2006.01)
  *G06F 1/26* (2006.01)
  *G06F 1/3206* (2019.01)

(52) U.S. Cl.
  CPC .......... *G06F 1/3228* (2013.01); *G06F 1/3287* (2013.01); *G06F 11/0751* (2013.01)

(58) Field of Classification Search
  CPC ........ G06F 11/0793; G06F 1/26; G06F 1/266; G06F 1/3206; G01N 2035/00881; G01N 30/00; G01N 30/86; G01N 35/00; G01N 35/00871
  USPC .......................................................... 713/300
  See application file for complete search history.

(56) References Cited

U.S. PATENT DOCUMENTS

| | | | | |
|---|---|---|---|---|
| 7,383,457 B1* | 6/2008 | Knight | ...................... | G06F 1/32 713/320 |
| 8,605,304 B2* | 12/2013 | Yanazume | ............ | G06F 1/3246 358/1.14 |
| 2005/0036913 A1* | 2/2005 | Yamakawa | ............ | G01N 35/02 422/65 |
| 2010/0300217 A1* | 12/2010 | Mizumoto | ............. | G01N 35/10 73/863.01 |
| 2014/0122905 A1* | 5/2014 | Chen | ........................ | G06F 1/26 713/300 |
| 2015/0331401 A1 | 11/2015 | Yokoi | | |
| 2016/0018863 A1* | 1/2016 | Bungo | ...................... | G06F 1/26 700/12 |
| 2017/0067922 A1* | 3/2017 | Antoni | ............ | G01N 35/00613 |
| 2017/0146500 A1 | 5/2017 | Kanazawa | | |

FOREIGN PATENT DOCUMENTS

| | | |
|---|---|---|
| JP | 2016-080466 A | 5/2016 |
| WO | 2015/198389 A1 | 12/2015 |

OTHER PUBLICATIONS

International Search Report for corresponding International Application No. PCT/JP2017/015345, dated Jun. 6, 2017.
Machine Translation of Written Opinion for corresponding International Application No. PCT/JP2017/015345, dated Jun. 6, 2017.
Taiwanese Office Action for corresponding Application No. 107111705, dated Apr. 8, 2019.

* cited by examiner

ANALYTICAL DEVICE, CONTROLLER, AND ANALYTICAL SYSTEM INCORPORATING A MAIN POWER SWITCH AND POWER SUPPLY INSTRUCTION PART DISPOSED SEPARATELY FROM THE MAIN POWER SWITCH

TECHNICAL FIELD

The present invention relates to an analytical device, a controller, and an analytical system that is constituted by the analytical device and the controller.

BACKGROUND ART

As an example, a liquid chromatograph is mainly constituted by modules including an automatic sampler, a pump, an oven, and a detector, and a controller that systematically controls the modules. The controller does not have a large mechanism, and thus in some cases, is stored in other modules. That is to say, a single analytical system is constituted by combining the modules and the controller.

In some cases, a device that independently has a function of starting and shutting down a power supply by software (hereinafter, referred to as "analytical device") is used as each of the modules constituting the analytical system (see Patent Document 1). Such an analytical device may be used by itself or may be incorporated and used in other analytical systems.

PRIOR ART DOCUMENTS

Patent Document

Patent Document 1: Japanese Patent Laid-open Publication No. 2016-80466

SUMMARY OF THE INVENTION

Problems to be Solved by the Invention

In a case where an analytical system is constituted by analytical devices with an independent power supply and a controller, to start or shut down the entire analytical system, it is necessary to start or shut down a power supply of each of the analytical devices incorporated in the analytical system in addition to a power supply of the controller. Consequently, the larger the number of the analytical devices incorporated in the analytical system is, the more complicated an operation of starting or shutting down the entire analytical system becomes.

An object of the present invention is to improve the convenience of power supply management of an analytical system constituted by one or a plurality of analytical devices and a controller.

Solutions to the Problems

An analytical device according to the present invention is an analytical device in an analytical system including one or more of the analytical devices and a controller that controls the analytical devices. The analytical device includes a communication part configured to communicate with the controller and a power supply control part configured to switch between a power-on state and a software power-off state of the analytical device by software based on an instruction to switch the analytical device to the power-on state or the software power-off state, the instruction being transmitted from the controller via the communication part.

That is to say, when a communication between the analytical device and the controller is established, that is, when the analytical device is incorporated in the analytical system, the analytical device according to the present invention is configured to be switched between a power-on state and a software power-off state by the controller.

In the present invention, the idea that the analytical device is in "software power-off state" is different from the idea that a main power supply of the analytical device is switched off. "Software power-off state" is a state where the main power supply is switched on but all or a part of a part that consumes power (hereinafter, referred to as "operation part") in the analytical device stops for the purpose of reducing power consumption of the analytical device. In the present specification, causing the analytical device to be in a power-on state is also referred to as "start", and causing the analytical device to be in a software power-off state is also referred to as "shut down".

The analytical device according to the present invention may independently include a power supply instruction input part to which a user power supply instruction based on a user's operation of switching the analytical device to a power-on state or a software power-off state by software is input not via the controller. The power supply instruction input part receives an input of a power supply instruction made by a user not via the controller. Examples of the power supply instruction input part include a power button that is pressed by a user to switch the analytical device to a power-on state or a software power-off state and a receiver that receives a signal from a remote controller. When the analytical device independently includes the power supply instruction input part, a user may shut down only several analytical devices by mistake during an operation of the analytical system.

The analytical device according to the present invention preferably includes a communication state determination part configured to determine whether a communication is established between the controller and the analytical device and a valid/invalid switching part configured to invalidate the user power supply instruction when the communication state determination part determines that the communication between the controller and the analytical device is established and to validate the user power supply instruction when the communication state determination part determines that the communication between the controller and the analytical device is not established. Consequently, when the communication between the analytical device and the controller is established, a power supply instruction to a single analytical device through a user's operation is invalidated, and thus, a user cannot shut down only the analytical device.

In the case described above, the analytical device further includes a light emitting part, and the light emitting part is preferably configured to be lit when the user power supply instruction is valid and to be lit off when the user power supply instruction is invalid. Consequently, a user can visually recognize whether the power supply instruction to a single analytical device through the user's operation is valid or invalid by a lighting state of the light emitting part.

In most cases, the analytical device that can be used by itself includes an error detector that detects an error in the analytical device. When an error occurs in a certain analytical device constituting the analytical system, the controller receives an error signal from the analytical device in which the error has been detected and recognizes that there is an error in the analytical system. The operation of the entire analytical system usually stops. In such a case, analytical devices other than the analytical device in which the error has occurred sometimes continue an analysis operation. However, as the analytical device with the error is present on a network of the analytical system, the analytical system cannot continue to operate. Depending on the type of errors, in some cases, the analytical device can recover from the error by restarting (by temporarily being caused to be in a software power-off state and then restarting). However, switching between a power-on state and a software power-off state of the analytical device in which the communication with the controller is established is managed by the controller in a centralized manner. Consequently, to restart the analytical device in which the error has occurred, the controller has to restart the entire analytical system.

In a preferable embodiment of the present invention, the valid/invalid switching part is configured to validate the user power supply instruction when the error detector detects an error. When an error occurs in the analytical device, the power supply instruction to a single analytical device through a user's operation is validated even if the analytical device is incorporated in the analytical system. Consequently, the analytical device in which the error has occurred can shut down or restart.

In addition, the valid/invalid switching part may be configured to invalidate the user power supply instruction when an error detected by the error detector is a predetermined serious error. "Serious error" is an error from which the analytical device does not recover by restarting. In such a case, by invalidating the instruction based on a user's operation, which is input to the power supply instruction input part, it is possible to prompt a user to switch off the main power supply of the analytical device.

A controller according to the present invention is a controller in an analytical system including one or more of the analytical devices and the controller that controls the analytical devices. The controller includes a communication part that communicates with each of the analytical devices and a power supply instruction transmitter that transmits via the communication part an instruction to switch the analytical device to a power-on state to the analytical device in which a communication with the controller has been established when the controller is in a power-on state, and that transmits via the communication part an instruction to switch the analytical device to a software power-off state to the analytical device in which a communication with the controller has been established when the controller is in a power-off state.

An analytical system includes the analytical device and the controller that are described above. In this case, the analytical device may be provided in plural. Conventionally, the larger the number of the analytical devices constituting the analytical system is, the more complicated power supply management becomes. However, as the present invention enables the controller to perform the power supply management of the entire system in a centralized manner, any number of the analytical devices may be provided.

Effects of the Invention

When the communication between the analytical device and the controller is established, the analytical device according to the present invention can also switch the analytical device to a power-on state or a software power-off state in response to a signal from the controller. It is possible to perform the power supply management of analytical devices constituting the analytical system in a centralized manner, thus improving the convenience of power supply management of the entire analytical system.

The controller according to the present invention includes a power supply instruction transmitter that transmits via the communication part an instruction to switch the analytical device to a power-on state to the analytical device in which a communication with the controller has been established when the controller is in a power-on state, and that transmits via the communication part an instruction to switch the analytical device to a software power-off state to the analytical device in which a communication with the controller has been established when the controller is in a power-off state. Consequently, it is possible to perform the power supply management of the analytical device in which a communication with the controller is established in a centralized manner.

In the analytical system according to the present invention, the controller can control switching between a power-on state and a software power-off state of the analytical device in a centralized manner. Consequently, it is easy to perform the power supply management of the entire analytical system.

EMBODIMENT OF THE INVENTION

Figure 1:
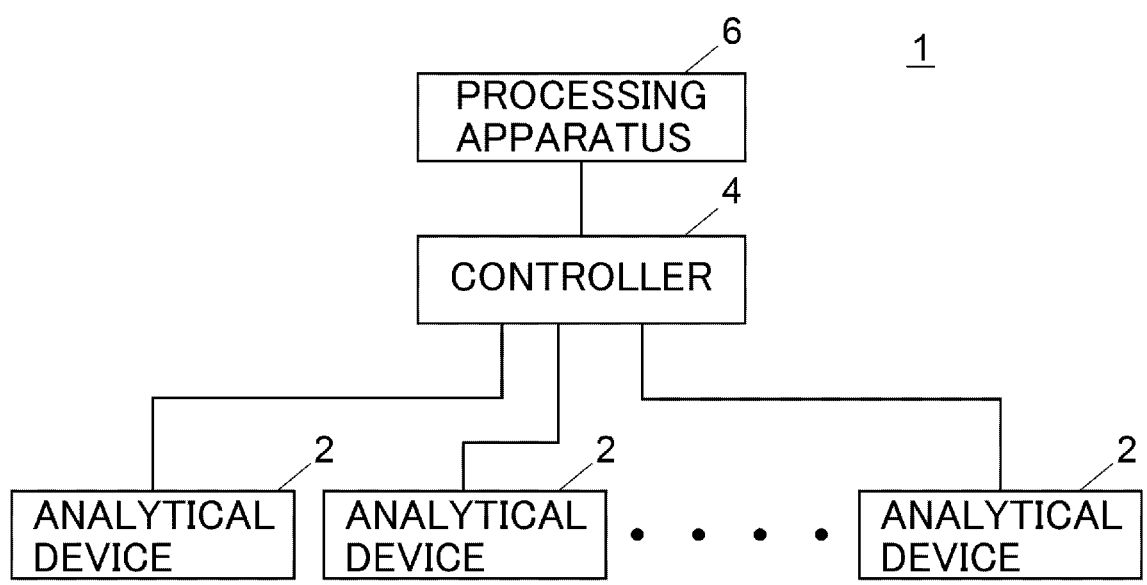
FIG. 1 is a schematic block diagram of an embodiment of an analytical system.

Hereinafter, an embodiment of an analytical device and an analytical system according to the present invention will be described with reference to the drawings.

A schematic configuration of the analytical system will be described with reference to FIG. 1.

An analytical system 1 according to the present embodiment includes a plurality of analytical devices 2, a controller 4, and a processing apparatus 6. Each of the analytical devices 2 is electrically connected to the controller 4 and is capable of electrically communicating with the controller 4. The processing apparatus 6 is electrically connected to the controller 4 and is capable of electrically communicating with the controller 4.

The controller 4 is used to manage a state or an operation of each analytical device 2 in a centralized manner. The controller 4 is achieved by, for example, a dedicated computer such as a system controller or a general-purpose computer such as a personal computer. The processing apparatus 6 has not only a function of managing an operation of the entire analytical system 1 through the controller 4 based on information such as an analytical condition input by a user, but also a function of performing various processing based on analytical data obtained by an analysis. The processing apparatus 6 is achieved by a dedicated computer or a general-purpose personal computer.

The controller 4 and the processing apparatus 6 are described as different elements in the present embodiment. However, the controller 4 and the processing apparatus 6 may function as a single element, for example, the processing apparatus 6 may have the function of the controller 4.

Figure 2:
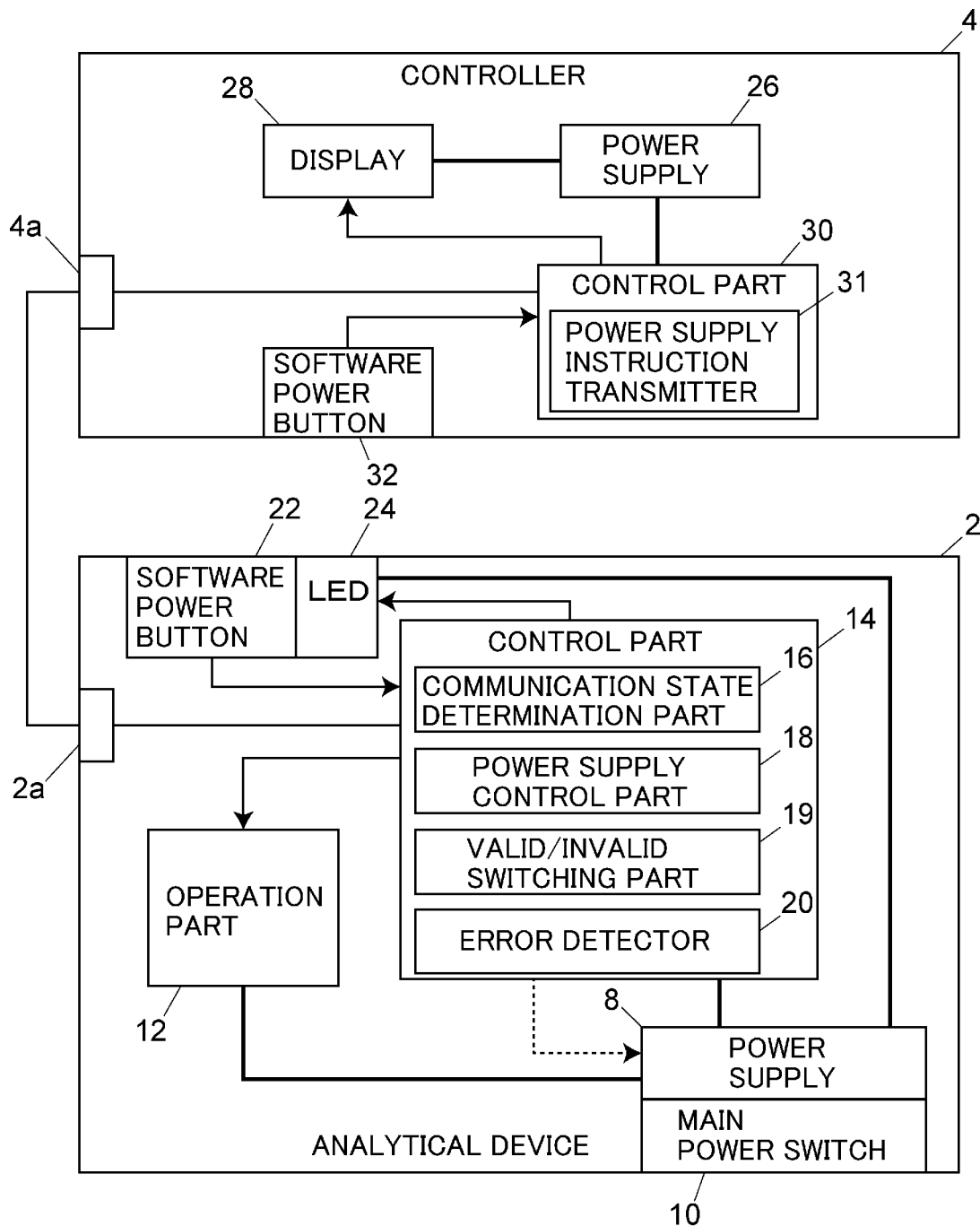
FIG. 2 is a block diagram of a configuration of a controller and an analytical device according to the embodiment.

Next, an example of a configuration of the analytical device 2 and the controller 4 will be described with reference to FIG. 2. It is to be noted that FIG. 2 illustrates only a single analytical device 2.

The analytical device 2 includes a communication part 2a, and the controller 4 includes a communication part 4a for the purpose of communicating with each other. The communication parts 2a and 4a are electrically connected to each other by a communication cable or wireless communication means. A control part 14 is connected to the communication part 2a of the analytical device 2, whereas a control part 30 is connected to the communication part 4a of the controller 4, so that signals are transmitted and received between the control part 14 and the control part 30. The control part 14 and the control part 30 are achieved by an electronic circuit with a logic element such as a microcomputer.

The controller 4 includes, in addition to the control part 30, a power supply 26, a display 28, and a software power button 32. When a user presses the software power button 32, the controller 4 is in a power-on state or in a software power-off state. The power supply 26 supplies power to the display 28 and the control part 30.

Hereinafter, causing the analytical device 2 and the controller 4 to be in a power-on state is referred to as "start", and causing the analytical device 2 and the controller 4 to be in a software power-off state is referred to as "shut down".

Starting or shutting down the controller 4 may be controlled by the processing apparatus 6 connected to the controller 4 (see FIG. 1).

The control part 30 of the controller 4 includes a power supply instruction transmitter 31. The power supply instruction transmitter 31 transmits a start instruction to the analytical device 2 that has communicated with the controller 4 at the start of the controller 4. The power supply instruction transmitter 31 transmits a shut-down instruction to the analytical device 2 that has communicated with the controller 4 when the controller 4 shuts down.

The analytical device 2 includes, in addition to the control part 14, a power supply 8, an operation part 12, and a software power button 22. The software power button 22 includes a light emitting diode (LED) 24 functioning as a light emitting part. The power supply 8 supplies required power to the operation part 12, the control part 14, and the LED 24. The power supply 8 includes a main power switch 10. When a user turns off the main power switch 10, power supply from the power supply 8 to the operation part 12, the control part 14, and the LED 24 is shut off.

The operation part 12 mainly consumes power in the analytical device 2. For example, when the analytical device 2 is an automatic sampler for a liquid chromatograph, examples of the operation part 12 include a motor for switching rotary switching valves, a motor for moving a sampling needle, and a motor for driving a pump that sucks and discharges a liquid. Alternatively, when the analytical device 2 is a column oven for adjusting the temperature of an analytical column in a liquid chromatograph, examples of the operation part 12 include a heater and a fan.

The software power button 22 is a power switch disposed separately from the main power switch 10 of the power supply 8. When a user presses the software power button 22, the analytical device 2 is switched between a power-on state and a software power-off state. The software power-off state is a state where the main power switch 10 is on but the operation part 12 stops to operate for the purpose of reducing power consumption of the analytical device 2.

The software power button 22 achieves a power supply instruction input part to which an instruction based on a user's operation of switching the analytical device 2 to a power-on state or a software power-off state (hereinafter, referred to as "user power supply instruction") is input not via the controller 4. According to the present embodiment, the user's operation corresponds to user's pressing the software power button 22.

As described later, when the analytical device 2 is not incorporated in the analytical system 1, the user power supply instruction is validated. When the user presses the software power button 22, the analytical device 2 starts or shuts down. That is to say, in a case where the user power supply instruction is valid, when the user presses the software power button 22, a signal indicating that the software power button 22 has been pressed is taken in the control part 14, and in response to the signal, the control part 14 starts or shuts down the analytical device 2.

There are two methods for the control part 14 to shut down the analytical device 2. One method is to stop an operation of the operation part 12 for the purpose of reducing power consumption of the operation part 12. The other method is to control the power supply 8 for the purpose of reducing power supplied from the power supply 8 to the operation part 12, as indicated by a broken line in FIG. 2. Any of these methods may be used in the present invention.

The control part 14 is configured to control the operation of the operation part 12 in response to a command signal from the controller 4. Moreover, the control part 14 includes a communication state determination part 16, a power supply control part 18, a valid/invalid switching part 19, and an error detector 20. The communication state determination part 16, the power supply control part 18, the valid/invalid switching part 19, and the error detector 20 are achieved by a logic element that constitutes the control part 14 executing a program.

The communication state determination part 16 is configured to determine whether communication with the controller 4 is established every fixed period of time. The communication state can be determined by, for example, transmitting a signal from the control part 14 of the analytical device 2 to the control part 30 of the controller 4 every fixed period of time and determining whether a response signal is transmitted from the control part 30. Alternatively, the communication state can also be determined by transmitting a signal from the control part 30 of the controller 4 every fixed period of time and determining whether the control part 14 has received the signal.

The power supply control part 18 is configured to start or shut down the analytical device 2 in response to a signal generated by the software power button 22 when a user power supply instruction is valid and in response to a start/shut-down instruction from the controller 4 when the communication between the analytical device 2 and the controller 4 is established. The valid/invalid switching part 19 switches validity and invalidity of the user power supply instruction.

When the communication state determination part 16 determines that the communication with the controller 4 is established except for a case where an error occurs in the analytical device 2, the valid/invalid switching part 19 is configured to invalidate a user power supply instruction. When the communication state determination part 16 does not determine that the communication with the controller 4 is established, the valid/invalid switching part 19 is configured to validate the user power supply instruction.

The valid/invalid switching part 19 is configured to light the LED 24 when a user power supply instruction is valid. The valid/invalid switching part 19 is configured to light off the LED 24 when the user power supply instruction is invalid. Consequently, a user can easily and visually recognize whether the user power supply instruction is valid or invalid.

The error detector 20 is configured to detect an error in the analytical device 2 and generate an error signal. The error signal generated by the error detector 20 is also taken in the control part 30 of the controller 4. On a side of the controller 4, a user can thus recognize the analytical device 2 in which an error occurs.

When the error detector 20 detects an error in a state where the communication between the analytical device 2 and the controller 4 is established, the valid/invalid switching part 19 is configured to validate a user power supply instruction except for a case where the error is a serious error (also referred to as "fatal error"). As the user power supply instruction is validated and the software power button 22 of the analytical device 2 in which the error has occurred is pressed, only the analytical device 2 in which the error has occurred can shut down or restart. In validating the user power supply instruction, power is supplied to the LED 24 to light the software power button 22. A user can thus recognize that the user power supply instruction is validated by pressing the software power button 22.

When the error occurred in the analytical device 2 is a fatal error, the valid/invalid switching part 19 is configured to invalidate a user power supply instruction. A user can learn the analytical device 2 in which the error has occurred through the controller 4 (or the processing apparatus 6 (see FIG. 1)), and thus, intends to shut down the analytical device 2 in which the error has occurred. However, the user power supply instruction is invalid in the case of the fatal error. For this reason, it is impossible to shut down the analytical device 2 by pressing the software power button 22. It is thus possible to prompt the user to forcibly shut down the analytical device 2 by turning off the main power switch 10.

An operation of the analytical system 1 having the functions described above will be described with reference to FIG. 2 and flowcharts of FIGS. 3, 4, and 5.

Figure 3:
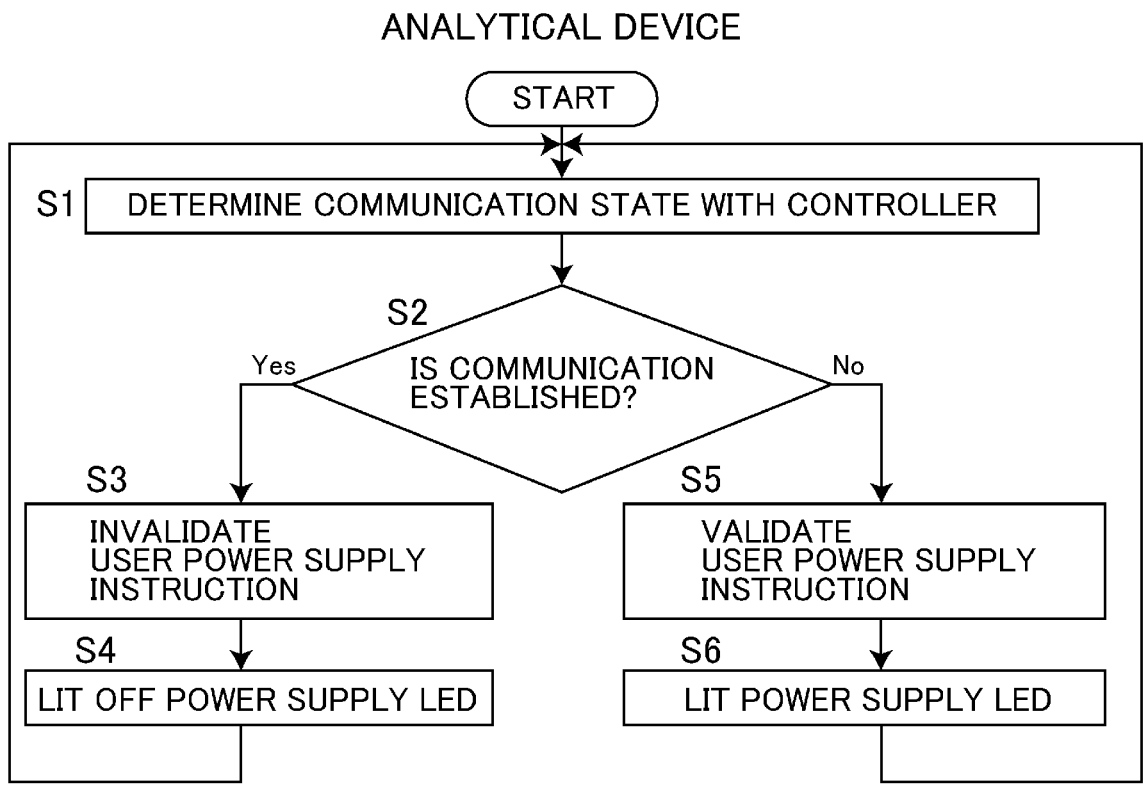
FIG. 3 is a flowchart of control of a function of a software power button in the analytical device according to the embodiment.

As illustrated in FIG. 3, in the analytical device 2, the communication state determination part 16 of the control part 14 determines a communication state with the controller 4 every fixed period of time (step S1). When the communication is established, the valid/invalid switching part 19 invalidates a user power supply instruction (steps S2 and S3) and lights off the LED 24 (step S4). When the communication state with the controller 4 is not established, the valid/invalid switching part 19 validates the user power supply instruction (steps S2 and S5) and lights the LED 24 (step S6).

Figure 4:
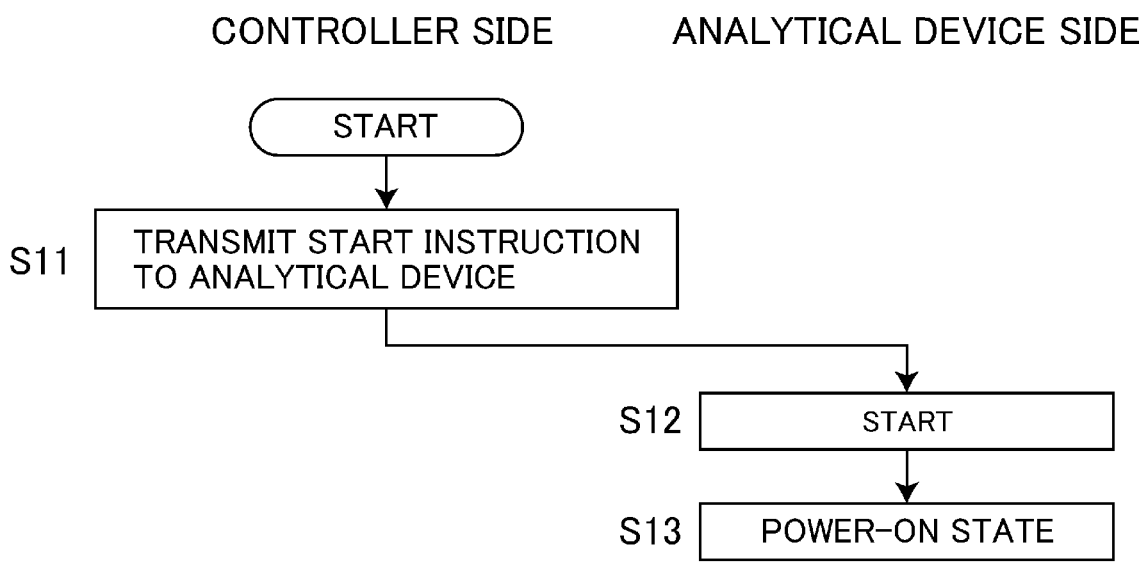
FIG. 4 is a flowchart of an operation when the analytical system according to the embodiment starts.

In a state where the analytical device 2 is incorporated in the analytical system 1 and the communication with the controller 4 is established, as illustrated in FIG. 4, when the controller 4 starts, a start instruction is transmitted from the controller 4 to the analytical device 2 (step S11). The power supply control part 18 of the analytical device 2 having received the start instruction starts the analytical device 2 (step S12) and the analytical device 2 is then in a power-on state (step S12).

Figure 5:
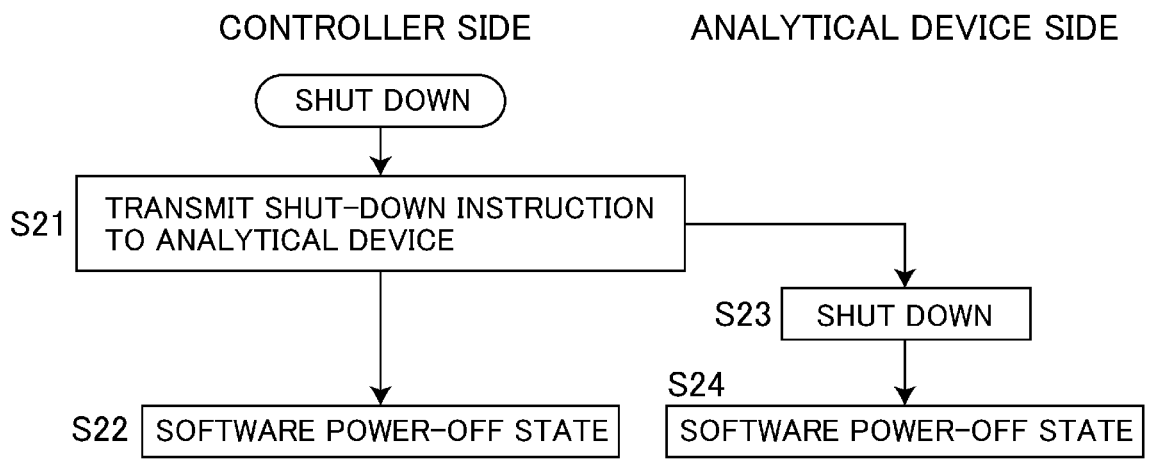
FIG. 5 is a flowchart of an operation when the analytical system according to the embodiment ends.

On the other hand, when the controller 4 shuts down as illustrated in FIG. 5, the power supply instruction transmitter 31 of the control part 30 transmits a shut-down instruction to the analytical device 2 (step S21), and the controller 4 is then in a software power-off state (step S22). The power supply control part 18 of the analytical device 2 having received the shut-down instruction shuts down the analytical device 2 (step S23), and the analytical device 2 is then in a software power-off state (step S24).

According to the function described above, when the analytical device 2 is incorporated in the analytical system 1, even if a user presses the software power button 22, the user cannot start or shut down only the analytical device 2. The analytical device 2 starts or shuts down according to the controller 4 starting or shutting down. Consequently, the user can perform power supply management of the entire analytical system 1 in a centralized manner through the controller 4.

Figure 6:
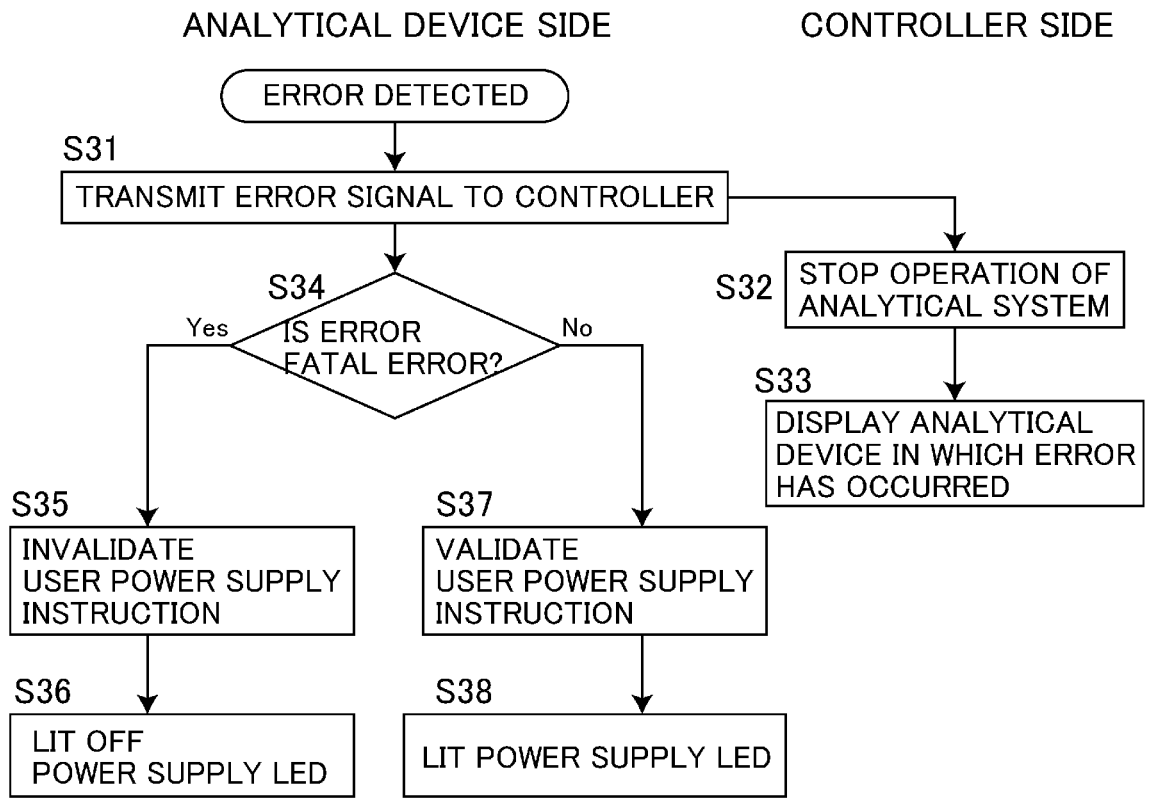
FIG. 6 is a flowchart of an operation when an error occurs in the analytical device according to the embodiment.

As illustrated in FIG. 6, when the error detector 20 of a certain analytical device 2 detects an error, the analytical device 2 transmits an error signal to the controller 4 (step S31). The controller 4 having received the error signal stops an operation of the analytical system (step S32) and displays the analytical device 2 in which the error has been detected on the display 28 or a display (not illustrated) of the processing apparatus 6 (see FIG. 1) connected to the controller 4 (step S33).

The analytical device 2 in which the error has been detected determines whether the error is a predetermined fatal error (step S34). Whether the error is a fatal error, for example, is determined by determining whether the detected error is found in a fatal error list prepared in the control part 14 of the analytical device 2.

When the error is a fatal error, the valid/invalid switching part 19 invalidates a user power supply instruction to the analytical device 2, lights off the LED 24 (step S35), and prompts a user to forcibly shut down the analytical device 2 using the main power switch 10. On the other hand, when the error is not a fatal error, the valid/invalid switching part 19 validates the user power supply instruction to the analytical device 2, lights the LED 24 (steps S36 and S37), and prompts the user to shut down or restart the analytical device 2 by pressing the software power button 22.

DESCRIPTION OF REFERENCE SIGNS

1: Analytical system
2: Analytical device
2a, 4a: Communication part
4: Controller
6: Processing apparatus
8, 26: Power supply
10: Main power switch
12: Operation part
14: Control part
16: Communication state determination part
18: Power supply control part
19: Valid/invalid switching part
20: Error detector
22, 32: Software power button (power supply instruction input part)
24: LED
28: Display

The invention claimed is:

1. An analytical device in an analytical system including a plurality of the analytical devices and a controller that controls the analytical devices,
wherein the analytical device is a module independently having a main power switch and a power supply instruction input part disposed separately from the main power switch, the main power switch is for switching on/off of power supply to all elements which consume power in the analytical device, and the power supply instruction input part is a part to which an instruction based on a user's operation of switching the analytical device to a power-on state or a software power-off state is input not via the controller, the analytical device comprising:

a communication part configured to communicate with the controller; and a power supply control part configured to switch between a power-on state and a software power-off state of the analytical device by software based on an instruction to switch the analytical device to the power-on state or the software power-off state, the instruction being transmitted from the controller via the communication part.

2. An analytical device according to claim 1, further comprising:

a communication state determination part configured to determine whether a communication is established between the controller and the analytical device; and a valid/invalid switching part configured to invalidate the user power supply instruction when the communication state determination part determines that the communication between the controller and the analytical device is established and to validate the user power supply instruction when the communication state determination part determines that the communication between the controller and the analytical device is not established.

3. The analytical device according to claim 2, further comprising a light emitting part, wherein the light emitting part is configured to be lit when the user power supply instruction is valid and to be lit off when the user power supply instruction is invalid.

4. The analytical device according to claim 2, further comprising an error detector for detecting errors, wherein serious errors are predefined, the valid/invalid switching part is configured to validate the user power supply instruction when the error detector detects an error unless the error corresponds to any one of the serious errors.

5. The analytical device according to claim 4, wherein the valid/invalid switching part is configured to invalidate the user power supply instruction when an error detected by the error detector corresponds to any one of the serious errors.

6. The analytical device according claim 1, wherein the analytical device is configured to be the power-on state in synchronization with that the controller becomes a power-on state and to be the software power-off state in synchronization with that the controller becomes a software power-off state.

7. An analytical system comprising:

the analytical device according to claim 1; and a controller for controlling the analytical device, wherein the controller comprises a communication part that communicates with each of the analytical devices; and a power supply instruction transmitter that transmits via the communication part an instruction to switch the analytical device to a power-on state to the analytical device in which a communication with the controller has been established when the controller is in a power-on state, and that transmits via the communication part an instruction to switch the analytical device to a software power-off state to the analytical device in which a communication with the controller has been established when the controller is in a power-off state.

* * * * *